Patented Jan. 20, 1931

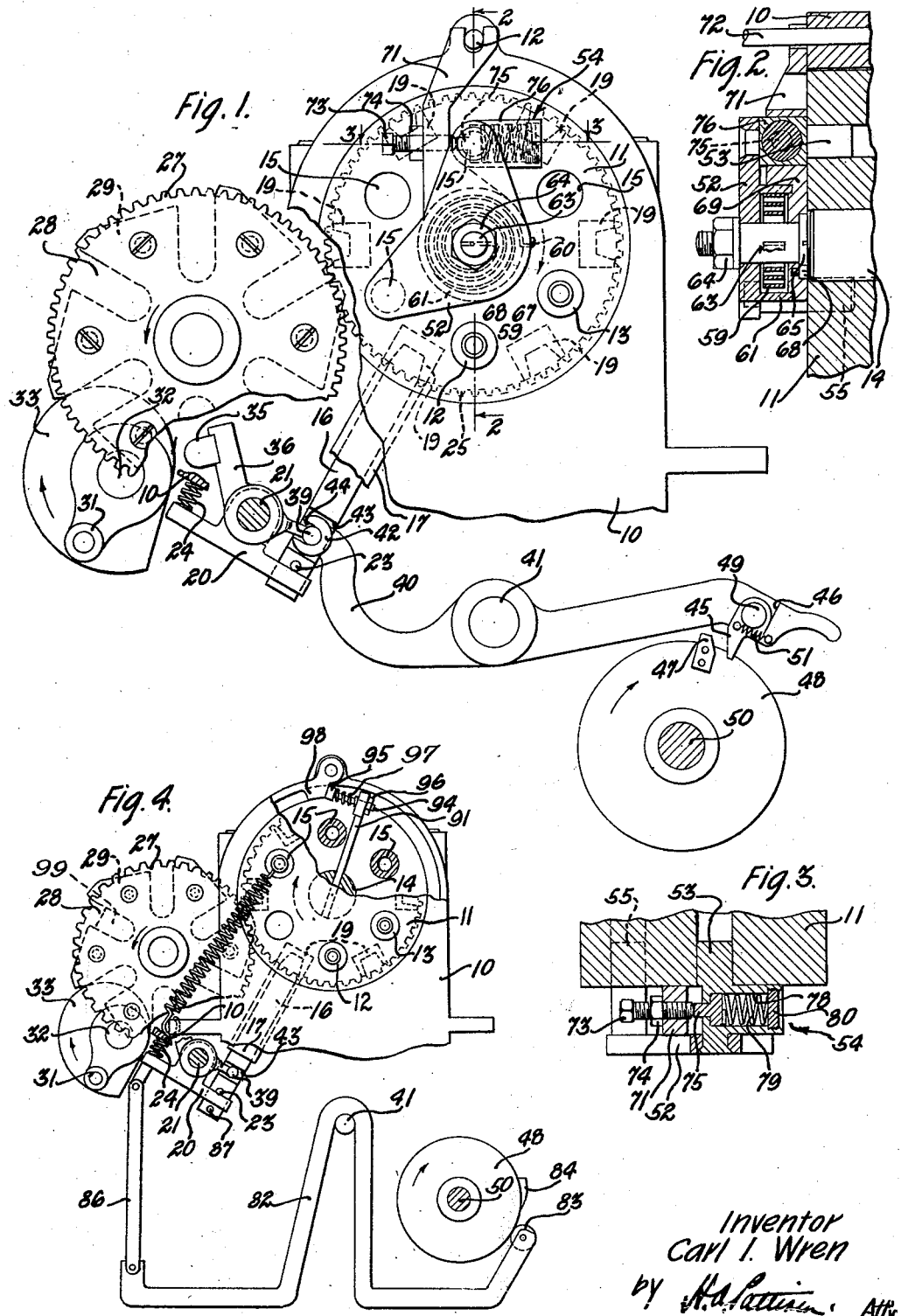

1,789,485

UNITED STATES PATENT OFFICE

CARL IVAR WREN, OF CICERO, ILLINOIS, ASSIGNOR TO WESTERN ELECTRIC COMPANY, INCORPORATED, OF NEW YORK, N. Y., A CORPORATION OF NEW YORK

INDEXING MECHANISM

Application filed April 12, 1928. Serial No. 269,330.

This invention relates to indexing mechanism and more particularly to indexing mechanism used in automatic screw machines having multpile tool-holding devices.

In the manufacture of metal parts in machines, such as automatic screw machines, there are some parts which require only two operations to be performed upon them by the tools mounted on the tool-holding turret of the machine. For example, a part may be only drilled and tapped. If the screw machine, upon which the part is to be made is designed to perform six operations, as is usual with these machines, it would be necessary to index the machine six times in order to perform the two operations or to have three sets of two tools each mounted on the turret. The first alternative would necessitate considerable lost time and considerable wear upon the machines, since the same time and wear would be necessary for the indexing operations of the turret for a part upon which two operations are performed as would be required for a part upon which six operations are performed. The second alternative would necessitate three sets of tools and would require a very accurate adjustment and almost constant observation of the tools in order to produce a uniform product.

The primary object of this invention is to adapt a material working apparatus including a multiple tool holder so that a number of tools less than the total may be used with a minimum loss of time and motion.

In accordance with one embodiment of this invention, as applied to a six tool automatic screw machine, there is provided apparatus which allows a tool-holding turret designed to hold six tools to rotate one-sixth of a revolution in the usual direction against the action of a spring and then to be returned by the action of the spring a corresponding distance. Thus, a six tool machine may be adapted so that only two tools are employed with no more loss of time or motion than is required in the usual operation of the machine when six tools are employed.

Other objects and advantages of this invention will more fully appear from the following detailed description taken in connection with the accompanying drawing which illustrates one embodiment of this invention, and in which Fig. 1 is a fragmentary transverse sectional view of an automatic screw machine embodying the present invention;

Fig. 2 is a vertical fragmentary sectional view thereof taken on the line 2—2 of Fig. 1 looking in the direction indicated by the arrows;

Fig. 3 is a horizontal fragmentary sectional view thereof taken on the line 3—3 of Fig. 1 looking in the direction indicated by the arrows, and Fig. 4 is a fragmentary transverse sectional view similar to Fig. 1 of another automatic screw machine embodying the invention.

Referring to the drawing in which like reference characters designate like parts throughout the several views, and particularly to Fig. 1 thereof, the numeral 10 designates generally the base of an automatic screw machine supporting a tool-holding turret 11 having a shaft 14 extending therefrom and normally held, with one of a plurality of tool-holding apertures 12, 13 and 15—15 at its lowermost position where it is directly in line with the material feeding spindle (not shown), by means of a locking plunger 16 positioned in a sleeve 17 attached to the frame 10, which plunger engages bushings 19—19 in the edge of the turret 11. The end of the locking plunger 16 opposite the turret 11 passes through a slot in a lever 20 pivoted on a fulcrum 21 and a pin 23 is mounted on the plunger 16 to engage the lever 20. A compression spring 24 is positioned between the end of the lever 20 opposite the locking plunger 16 and a part of the base 10 and tends to force the locking plunger 16 upwardly into the bushings 19—19 in the edge of the turret 11.

The turret 11 has a gear 25 formed on the rear side thereof which meshes with a gear 27 having a Geneva gear 29 secured concentrically therewith and a driving member 31 for actuating the Geneva gear is mounted on a shaft 32 adjacent the gear 29, which shaft 32 is intermittently driven by a source of power (not shown). An eccentric cam 33 is also mounted on the shaft 32 so as to engage a stud 35 fixed to a bell crank lever 36 which is pivoted on the fulcrum 21 and which has a stud 39 formed thereon at the end opposite the stud 35. A trip lever 40 which is pivoted on a fulcrum 41 is provided with a head portion 42 which engages a slot 43 cut in the locking plunger 16 and which has a slot 44 cut therein to receive the stud 39. An adjustable cam 45, which engages a cam 47 on a revolving drum 48 driven by a shaft 50 connected to a source of power (not shown), is attached to the other end of the trip lever 40 by means of a screw 49 and may be retained in engagement with a shoulder 46, as shown in solid lines in Fig. 1 by means of a spring 51. The cam 45 may also be rotated about the screw 49 into the position against the shoulder 46 shown by dotted lines, if desired, to permit the operation of the screw apparatus in the usual manner, and the spring 51 will also serve to retain the cam 45 in its rotated position.

A plate 52 (Fig. 2) having fixed thereto a positioning device designated generally by the numeral 54 is positioned on the face of the turret 11 by means of fingers 53 and 55 which are inserted in tool-holding apertures 15—15 and which extend from the plate 52. One end of a spiral spring 59 is fixed in a slot 60 cut in a circular flange 61 extending from the plate 52, and the other end of the spring 59 is attached to a shaft 63 about which the spring 59 is positioned and about which the plate 52 rotates when the turret 11 is rotated. A plate 69 encircles the shaft 62, which shaft has a nut 64 threaded on one end thereof and a head 65 formed on the other end thereof, and the shaft 63 is prevented from moving with respect to the plate 69 by a screw 68 threaded in the plate 69 and having the head thereof positioned in a notch 67 in the head 65. The plate 69 has an arm 71 formed thereon which engages a rod 72 fixed to the base 10 and which has threaded therein an adjustable stop member comprising a stop screw 73 having a lock nut 74 associated therewith, which screw 73 contacts with a T-shaped plunger 75 slidably positioned in a cylindrical bore 78 formed in a portion of the positioning device 54 and normally urged to the left (Fig. 3) by means of an expansion spring 79 mounted in the bore 78 and retained therein by a threaded head 80.

It is believed that the operation of the apparatus will be readily understood from the foregoing detailed description and from the following description of its operation. Assuming that as shown in Fig. 1 the tool-holding aperture 12 is opposite the material feeding spindle (not shown), that is, at its lowermost position, the shaft 32 is rotated in a clockwise direction at predetermined intervals by gearing (not shown) causing the cam 33 to engage the stud 35, thus rocking the lever 36 about the fulcrum 21 and through the action of the stud 39 withdrawing the locking plunger 16 from the associated bushing 19. The driving member 31 then engages the Geneva gear 29, thereby causing the turret 11 to rotate one-sixth of a revolution in a clockwise direction against the force of the spring 59, thus bringing the tool mounted in tool-holding aperture 13 to its lowermost position and opposite the material feeding spindle (not shown). The cam 47 on the drum 48 is positioned so that when the tool held in the tool-holding aperture 13 has completed its operation on the material, the cam 47 will engage the cam 45 on the tripping lever 40, rocking the lever 40 about its fulcrum 41 and causing the lever 40 to withdraw the locking plunger 16 from the bushing 19. Since the driving member 31 is at this time out of engagement with the Geneva gear 29, the Geneva gear and associated gears are free to rotate and the turret 11 may be rotated in a counter-clockwise direction one-sixth of a revolution by the spring 59 against the force of which the turret 11 had been rotated. The turret is restrained from turning more than one-sixth of a revolution in a counter-clockwise direction by the engagement of the screw 73 with the plunger 75. The turret 11 is partially positioned by the engagement of the screw 73 with the plunger 75 so that the cam 47 having passed the cam 45 the locking plunger 16 is caused to enter one of the bushings 19 by the spring 24, whereupon the tool in tool-holding aperture 12 is again opposite the material feeding spindle. After the tool in tool-holding aperture 12 has completed its operation, the turret 11 will again be rotated in a clockwise direction by means of the Geneva drive member 31 and the above outlined operations will be repeated.

In another embodiment of this invention, as illustrated by Fig. 4, the lever 40 and parts associated therewith are replaced by a lever 82 pivoted at a point intermediate its ends on a fulcrum 41 and having at one end thereof a roller 83 which engages a cam 84 on the drum 48. At the other end of the lever 82 is pivoted a link 86 which connects the lever 82 to the lever 20, which at its other end normally engages a pin 23 on the locking plunger 16, thus tending to force the locking plunger 16 into the bushings 19 on the edge of the turret 11. Upon the engagement of the roller 83 with the cam 84, the lever 20 engages a pin 87 on the locking plunger 16 to withdraw the plunger 16 from the bushing 19. The reversing mechanism on the face of the turret 11 is replaced by a coil spring 88 which has one end fixed to a pin 90 mounted in one of the tool-holding apertures 15 and the other end fixed to the frame 10. The positioning device is replaced by an arm 91, one end of which is secured within a hole in the shaft 14, and the other end of which has a pin 94 slidably positioned in a hole formed near the end of arm 91. The pin 94 has a head 95 formed on one end thereof, a nut 96 is threaded on the other end thereof and the pin 94 is urged to the left (as shown in Fig. 4) by a compression spring 97 positioned thereabout which engages the head 95 and the arm 91 so that the head 95 thereof will resiliently engage a projecting portion 98 of the base 10.

In this embodiment of the invention a member 99 is driven into the slot of the Geneva gear 29 which would in the ordinary rotation of the turret in a clockwise direction be engaged by the driving member 31 to move the tool holding spindle 13 out of operating position after it has completed its operation on the material.

The operation of the second embodiment of this invention is the same as that of the first embodiment described herein except as follows: The locking plunger 16 is withdrawn from the bushing 19 by means of the eccentric 33 and the turret rotated in a clockwise direction by the Geneva gear 29 and drive member 31 against the action of the spring 88 to move the tool-holding aperture 13 to the lowest position. The tool mounted in tool-holding aperture spindle 13 having completed its operation on the material, the cam 84 will engage the roller 83 and rock the lever 82 which in turn through the link 86 will rock the lever 20, thus causing the lever 20 to engage pin 87 on locking plunger 16 and to withdraw said plunger 16 from the bushing 19. The locking plunger 16 having been withdrawn, the spring 88 will cause the turret to rotate in a counter-clockwise direction until the head 95 of the pin 94 engages the portion 98 of the base 10, whereupon the cam 84 having passed the roller 83, the locking plunger 16 will be caused to engage the bushing 19 and the tool in tool-holding aperture 12 will be in the lowermost position.

The member 99 inserted in the slot of the Geneva gear 29 acts as a safety device to prevent damage to the tools mounted on the turret in the event that the spring 88 is broken or in any manner disengaged so that it will not serve to reverse the movement of the turret. This member 99 prevents the driving member 31 from entering the slot on the Geneva gear and thereby prevents the Geneva gear from indexing the turret. This safety element is not needed in the first embodiment of the invention since the finger 55 will engage the arm 71 in that embodiment of the invention and thereby prevent the Geneva gear from turning the turret.

The foregoing description covers a specific embodiment of the invention wherein an automatic screw machine is provided with a turret having six tool stations, but it is obvious that the invention is applicable to other types of tool holders and that it may be applied to any tool holder having three or more tool stations. In the description and claims, therefore, the term "multiple tool holder" has been used to designate tool holders having three or more tool stations.

What is claimed is:

1. In a material working apparatus, a rotatable multiple tool holder, means for rotating the tool holder in one direction to bring one of the tools into operating position, means for rotating the tool holder in the opposite direction to bring another of the tools into operating position, means for locking the tool holder against rotation in either of the above mentioned positions, and means for automatically releasing the locking means at predetermined intervals to permit the means for rotating the tool holder to function.

2. In a material working apparatus, a rotatable tool holder, a spring, means for rotating the tool holder against the action of the spring to bring a tool into operating position, means for releasing the tool holder to permit the spring to rotate the tool holder in the opposite direction to bring another tool into operating position, means for automatically locking the tool holder in either of the above mentioned positions, and means for automatically releasing the locking means at predetermined intervals to permit the means for rotating the tool holder against the action of the spring to function.

3. In a material working apparatus, a rotatable tool holder, means for rotating the tool holder in one direction to bring a tool into operating position, a spring actuated device mounted on the tool holder for rotating the tool holder in the opposite direction to bring another tool into operating position, means for approximately positioning the tool holder after its rotation by the spring actuated device, means for accurately positioning and locking the tool holder in either of the above mentioned positions, and means for automatically releasing the locking means at predetermined intervals to permit the means for rotating the tool holder to function.

4. In a material working apparatus, a pivotally movable multiple tool holder, a tension spring, means for pivotally moving the tool holder in one direction against the tension of the spring to bring a tool into operating position, and means for releasing the tool holder to permit the spring to pivotally move the tool holder in the opposite direction and thereby bring another tool into operating position.

5. In a material working apparatus, a rotatable tool holder, a spring tending to hold the tool holder with a tool in operating position, means for rotating the tool holder against the action of the spring to bring another tool into operating position, means for automatically locking the tool holder in either of the above mentioned positions, means for automatically releasing the locking means at predetermined intervals to permit the means for rotating the tool holder to function, and means for automatically releasing the locking means at predetermined intervals to permit the spring to rotate the tool holder in the opposite direction.

6. In a material working apparatus, a framework, a movable tool holder supported thereby, means for moving the tool holder in one direction to bring a tool into operating position, means for moving the tool holder in the opposite direction to bring another tool into operating position, comprising a shaft, a plate affixed to the shaft, a plate rotatable about the shaft, an arm extending from the first mentioned plate which engages a part of the framework, and a spiral spring positioned between the plates and about the shaft, one end of which is attached to the shaft and the other end of which is attached to the plate rotatable about the shaft, means for positioning the tool holder after its movement by the second mentioned means for moving the tool holder, means for locking the tool holder in either of the above mentioned positions, and means for automatically releasing the locking means at predetermined intervals to permit the two first mentioned means to function.

7. In a material working apparatus, a tool holder, means for imparting a relative movement between the material to be worked upon and the tool holder to bring them into operating position, means for causing a relative movement between the material to be worked upon and the tool holder in the reverse direction to change the operating position, means for preventing the relative movement, and means for automatically releasing the locking means at predetermined intervals.

8. In combination with an automatic screw machine having a tool holder capable of being moved to a plurality of tooling positions, of an attachment for rendering only two of said positions effective, including means for moving the tool holder to bring a tool into an operating position, means for preventing the further movement of said tool holder, means for rendering the preventing means ineffective at predetermined intervals, and means for thereafter moving said tool holder to bring a different tool into an operating position.

9. In combination with an automatic screw machine having a tool holder capable of being moved to a plurality of tooling positions, of an attachment for rendering only two of said positions effective, including means for positively moving the tool holder to move the tool into an operating position, means for preventing the further movement of said tool holder, means for rendering the preventing means ineffective at predetermined intervals, and a spring in which energy is stored upon the initial movement of the holder effective thereafter for bringing the holder to present a different tool.

In witness whereof, I hereunto subscribe my name this 31st day of March A. D., 1928.

CARL IVAR WREN.